United States Patent
Nagao et al.

(10) Patent No.: US 11,095,651 B2
(45) Date of Patent: Aug. 17, 2021

(54) COMMUNICATION APPARATUS AND NON-TRANSITORY COMPUTER READABLE STORAGE MEDIUM

(71) Applicant: ALAXALA Networks Corporation, Kawasaki (JP)

(72) Inventors: Koyuru Nagao, Kawasaki (JP); Keigo Uchizumi, Kawasaki (JP)

(73) Assignee: ALAXALA NETWORKS CORPORATION, Kawasaki (JP)

( * ) Notice: Subject to any disclaimer, the term of this patent is extended or adjusted under 35 U.S.C. 154(b) by 269 days.

(21) Appl. No.: 16/247,882

(22) Filed: Jan. 15, 2019

(65) Prior Publication Data

US 2019/0222578 A1   Jul. 18, 2019

(30) Foreign Application Priority Data

Jan. 16, 2018   (JP) .............................. JP2018-005228

(51) Int. Cl.
  *H04L 29/06*   (2006.01)
(52) U.S. Cl.
  CPC ........ *H04L 63/101* (2013.01); *H04L 63/1408* (2013.01); *H04L 63/20* (2013.01)
(58) Field of Classification Search
  CPC ....... H04L 63/10; H04L 63/101; H04L 63/14; H04L 63/1408; H04L 63/1425; H04L 63/20
  See application file for complete search history.

(56) References Cited

U.S. PATENT DOCUMENTS

| | | | |
|---|---|---|---|
| 7,729,271 B2* | 6/2010 | Tsuchiya | ............. H04L 63/1425 370/252 |
| 7,969,880 B2* | 6/2011 | Yano | ....................... H04L 45/00 370/230.1 |
| 9,369,434 B2* | 6/2016 | Kim | ................... H04L 63/0227 |
| 2007/0115850 A1* | 5/2007 | Tsuchiya | ............. H04L 63/1458 370/252 |

(Continued)

FOREIGN PATENT DOCUMENTS

| JP | 2010-003054 A | 1/2010 |
|---|---|---|
| JP | 2017-005402 A | 1/2017 |

(Continued)

OTHER PUBLICATIONS

Japanese Office Action received in corresponding Japanese Application No. 2018-005228 dated Jul. 6, 2021.

(Continued)

*Primary Examiner* — Khang Do
(74) *Attorney, Agent, or Firm* — Mattingly & Malur, PC

(57) ABSTRACT

A communication apparatus that transfers received data stores a whitelist to manage an allowed object that is allowed to perform communications via the communication apparatus, comprises: a transfer unit that performs transfer control on the received data based on the whitelist; and a control unit that analyzes behavior related to communications performed by the allowed object. The control unit being configured to calculate a monitoring parameter that indicates the behavior related to the communications performed by the allowed object, and detect the allowed object where an abnormality occurred based on the monitoring parameter.

10 Claims, 9 Drawing Sheets

(56) References Cited

U.S. PATENT DOCUMENTS

| | | |
|---|---|---|
| 2009/0238081 A1 | 9/2009 | Miyata |
| 2010/0091770 A1* | 4/2010 | Ishikawa ................ H04L 47/28 370/389 |
| 2011/0170552 A1* | 7/2011 | Suzuki ................ H04L 49/9078 370/401 |
| 2012/0033550 A1* | 2/2012 | Yano ................ H04L 47/10 370/230 |
| 2013/0269031 A1* | 10/2013 | Nakao ................ H04L 63/1408 726/22 |
| 2015/0067764 A1* | 3/2015 | Kim ................ H04L 63/101 726/1 |
| 2018/0144119 A1 | 5/2018 | Kishikawa et al. |
| 2020/0059399 A1* | 2/2020 | Higuchi ............ H04L 43/0852 |
| 2020/0287914 A1* | 9/2020 | Swanson ............ G06F 16/137 |
| 2020/0314130 A1* | 10/2020 | Nakai ............ G06F 21/552 |

FOREIGN PATENT DOCUMENTS

| | | | |
|---|---|---|---|
| JP | 2017005402 A | * | 1/2017 |
| JP | 2017-50481 A | | 3/2017 |
| JP | 2018-7179 A | | 1/2018 |

OTHER PUBLICATIONS

Yamaguchi, T. et al., "Potentiality of Whitelisting Intrusion Detection Method for Plant Control System", 2016 Symposium on Cryptography and Information Security, Jan. 22, 2016, pp. 1-6 with partial translation.

* cited by examiner

| ID | PACKET_ RECEPTION_ UNIT NUMBER | VLAN_ NUMBER | SOURCE_ MAC_ ADDRESS | DESTINATION_ MAC_ ADDRESS | PROTOCOL | SOURCE_ IP_ADDRESS | DESTINATION_ IP_ADDRESS | SOURCE_ PORT_ NUMBER | DESTINATION_ PORT_ NUMBER |
|---|---|---|---|---|---|---|---|---|---|
| 1 | #1 | VLAN 1 | aaaa | bbbb | pr1 | xxx.xxx | yyy.yyy | P1 | P4 |
| ... | ... | ... | ... | ... | ... | ... | ... | ... | ... |
| n | #2 | VLAN k | aabb | cccc | pr2 | xxx.vvv | yyy.zzz | P3 | P1 |

FIG. 3A

| 800 801 | 811 MINIMUM COMMUNICATION INTERVAL | 812 MAXIMUM COMMUNICATION INTERVAL | 813 LAST COMMUNICATION INTERVAL | 814 TIMER |
|---|---|---|---|---|
| ID | | | | |
| 1 | 30msec | 10min | 2017/11/30 10:31:41 | 10msec |
| ⋮ | ⋮ | ⋮ | ⋮ | ⋮ |
| n | 15msec | 30min | 2017/12/04 19:06:28 | 1hour |

COMMUNICATION APPARATUS AND NON-TRANSITORY COMPUTER READABLE STORAGE MEDIUM

CLAIM OF PRIORITY

The present application claims priority from Japanese patent application JP 2018-5228 filed on Jan. 16, 2018, the content of which is hereby incorporated by reference into this application.

BACKGROUND OF THE INVENTION

The present invention relates to a communication apparatus having a whitelist function.

In recent years, security incidents where network of critical infrastructure such as a power plant is intruded by an attacker and the system control is taken over have been frequently taking place. In order to defend the network of the critical infrastructure from such an attack, a firewall device, a security software installed in a computer such as a personal computer, and the like are used. However, those defensive measures are not enough to completely prevent the attack.

A whitelist function can be used to reduce a risk when the network is compromised by an attacker. The whitelist function is to restrict operations of an object not registered in a list that is generated in advance to indicate terminals and applications that are allowed to perform operations such as communications. In a system and equipment such as a control system where prescribed operations are constantly performed after start-up and an exceptional operation is very rare, the whitelist function is very effective to prohibit undefined operations.

The technology described in Japanese Patent Application Laid-open Publication No. 2017-005402 is known as a technology to apply the whitelist function to a communication apparatus such as a network switch.

Japanese Patent Application Laid-open Publication No. 2017-005402 discloses "a communication apparatus including: a storage unit that stores a whitelist having therein header information included in received data during a generation period; and a transfer unit that receives data during an operation period, allows to transfer the data to a destination in a case where header information included in the data is stored in the whitelist and the reception of the data occurred within a time frame related to communication control using the whitelist of the header information included in the data, which is based on a reception history of data received during the operation period, and does not allow to transfer the data the destination in a case where the header information included in the data is stored in the whitelist but the reception of the data did not occur within the time frame."

On the other hand, the technology described in Japanese Patent Application Laid-open Publication No. 2010-003054 is known as a technology to monitor the operation status in the system.

Japanese Patent Application Laid-open Application No. 2010-003054 discloses "a network management system including: a data obtaining apparatus that receives data sent from an IP node and stores the latest reception time of data sent from each IP node; and a management apparatus that identifies the operation state of each IP node based on the latest reception time of each IP node stored in a memory unit of the data obtaining apparatus.

In the related arts described in Japanese Patent Application Laid-open Publication No. 2017-005402 and Japanese Patent Application Laid-open Publication No. 2010-003054, a communication apparatus having the whitelist function is configured to generate a whitelist that registers objects allowed for communications based on header information of received packets and the like. The prior communication apparatus can detect packets of an object that is not registered based on the whitelist.

SUMMARY OF THE INVENTION

In the prior configuration, in a case of receiving packets related to an object registered in the whitelist, the communication apparatus determines that the communication is legitimate, and transfers the packets. This means that the prior communication apparatus has a problem of not capable of detecting an abnormality of the object registered in the whitelist. Examples of the abnormality of the object registered in the whitelist include a lost terminal due to unauthorized removal or theft, and intrusion to the network using an object infected with virus.

In order to detect such abnormalities of the objects, a monitoring system for the operation of the objects such as terminals and a security appliance need to be installed in addition to the communication apparatus. However, if the system and the security appliance are to be installed, the overall system would be more complex, and the cost of the system would increase.

An object of the present invention is to provide a communication apparatus and a program that detect an abnormality of an object that is registered in a whitelist.

A representative example of the present invention disclosed in this specification is as follows: a communication apparatus that transfers received data, comprises an arithmetic device; a storage device coupled to the arithmetic device; and a communication interface coupled to the arithmetic device, and stores a whitelist to manage an allowed object that is allowed to perform communications via the communication apparatus. the communication apparatus comprises: a transfer unit being configured to perform transfer control on the received data based on the whitelist; and a control unit being configured to analyze behavior related to communications performed by the allowed object. The control unit being configured to: calculate a monitoring parameter that indicates the behavior related to the communications performed by the allowed object, and detect the allowed object where an abnormality occurred based on the monitoring parameter.

According to an embodiment of the present invention, a communication apparatus having the whitelist function can detect an abnormality of an object such as a terminal allowed to perform communications. Other problems, configurations, and effects than those described above will become apparent in the descriptions of embodiments below.

BRIEF DESCRIPTION OF THE DRAWINGS

The present invention can be appreciated by the description which follows in conjunction with the following figures, wherein:

FIG. 3A and FIG. 3B are diagrams showing an example of data structure of a whitelist stored in a whitelist storage memory of Embodiment 1;

FIG. 4 is a flowchart for explaining the process executed by a packet transfer unit of Embodiment 1 in a learning state;

DETAILED DESCRIPTION OF THE EMBODIMENTS

Figure 1:
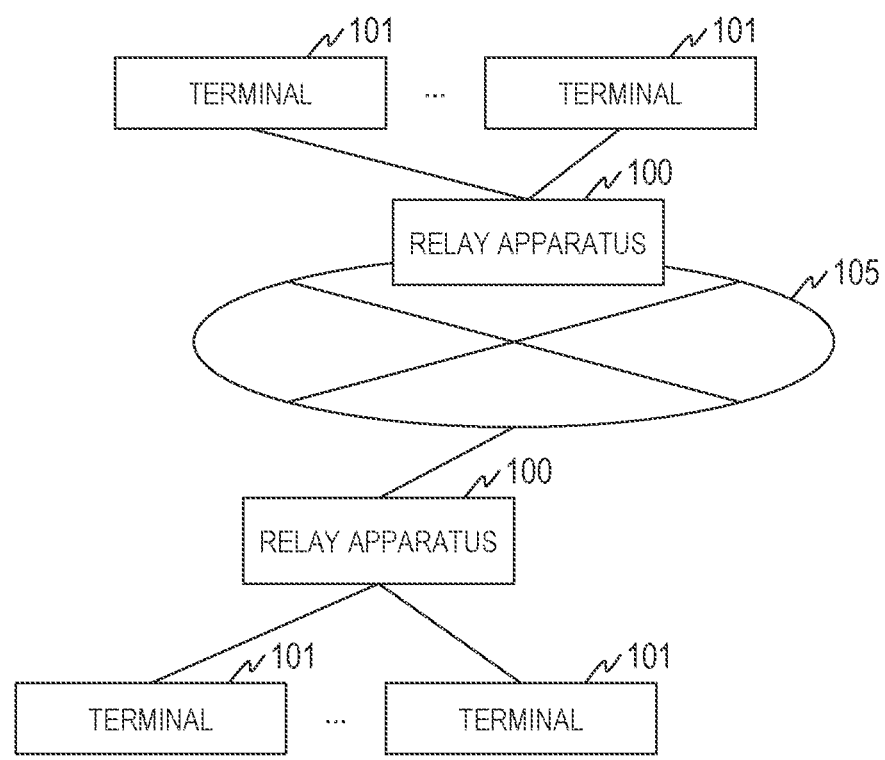
FIG. 1 is a diagram showing a configuration example of a communication system of Embodiment 1.

First, an overview of the present invention will be explained.

A relay apparatus of the present invention performs the following processes on an object (terminal or application) registered in a whitelist. In the descriptions below, the object registered in the whitelist will be referred to as an allowed object.

The relay apparatus analyzes behavior related to communications performed by the allowed object in a network. Specifically, the relay apparatus calculates a monitoring parameter that indicates the behavior related to communications. As described below, a communication interval is used for the monitoring parameter.

If a terminal being the allowed object, or a terminal on which an application being the allowed object is run is infected with virus and used as a stepping stone for the DDoS attack, the terminal performs communications frequently at short time intervals. Thus, the relay apparatus detects an allowed object that performs communications with a communication interval shorter than a prescribed threshold, and determines that the detected allowed object is infected with virus.

If a terminal being the allowed object, or a terminal on which an application being the allowed object is run is lost due to an unauthorized removal or theft, no communication would be performed for a long period of time. Thus, the relay apparatus detects an allowed object that performs communications with a communication interval greater than a prescribed threshold, or in other words, an allowed object that performs no communications for a prescribed period of time, and determines that the detected allowed object is lost.

Below, embodiments of the present invention will be explained with reference to appended figures. Configurations common between the respective figures are given the same reference characters.

Embodiment 1

Figure 2:
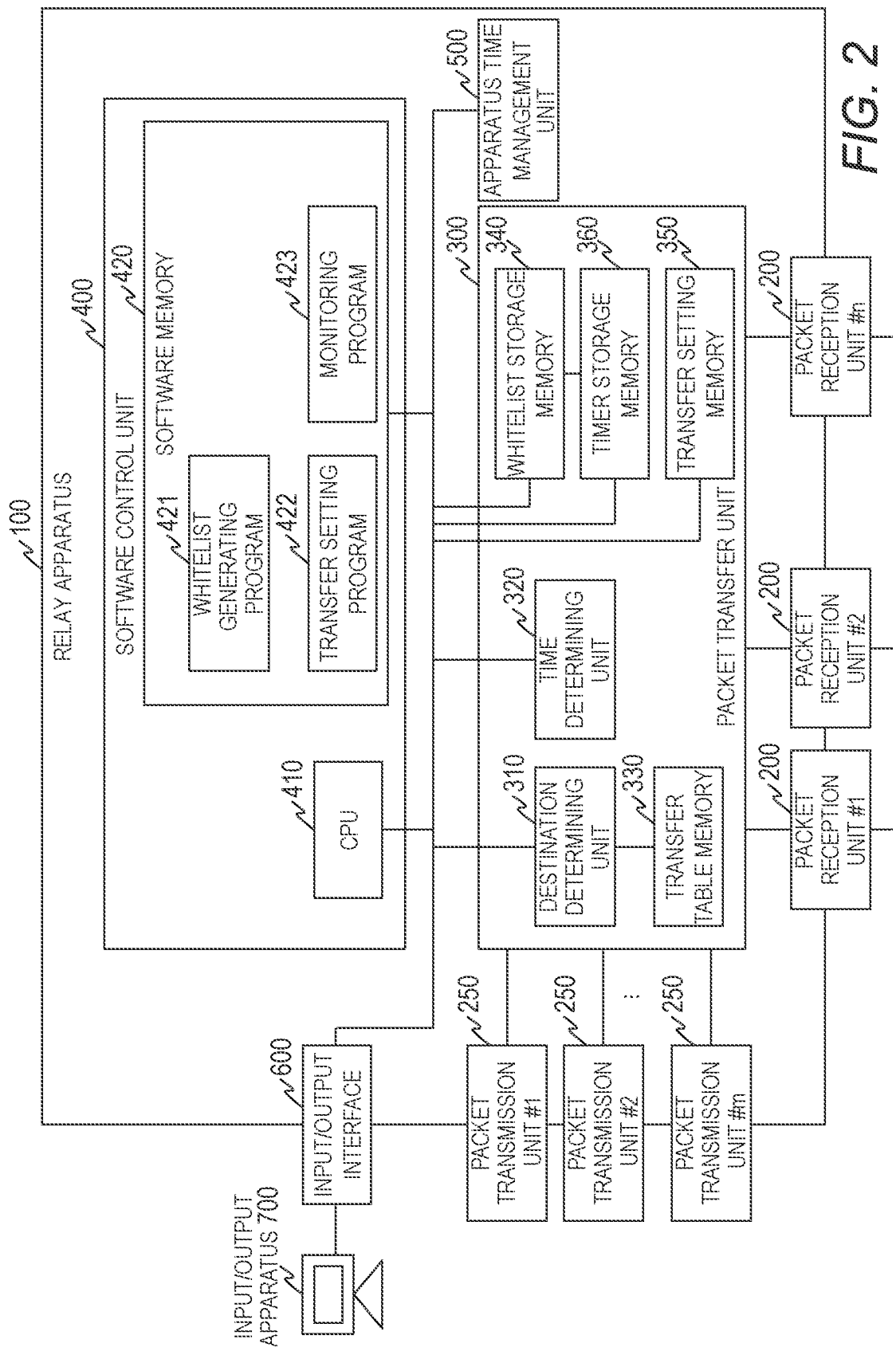
FIG. 2 is a diagram showing a configuration example of a relay apparatus of Embodiment 1.

FIG. 1 is a diagram showing a configuration example of a communication system of Embodiment 1. FIG. 2 is a diagram showing a configuration example of a relay apparatus 100 of Embodiment 1.

The communication system includes a plurality of relay apparatuses 100 and a plurality of terminals 101. A relay apparatus 100 and other communication apparatuses are coupled to one another via a network 105 such as LAN (Local Area Network), WAN (Wide Area Network), or the Internet.

Each of the plurality of relay apparatuses 100 is coupled to the plurality of terminals 101. A terminal 101 is a server, smartphone, or tablet on which the application is run. In this embodiment is not limited to the type of the terminal 101.

The relay apparatus 100 is a communication apparatus that relays data (packet) passing through the network. The relay apparatus 100 of this embodiment stores therein a whitelist 800 (see FIG. 3A) for realizing the whitelist function. The whitelist 800 is a list that includes information to identify objects allowed to perform communications (allowed objects).

The relay apparatus 100 includes a plurality of packet reception units 200, a plurality of packet transmission units 250, a packet transfer unit 300, a software control unit 400, an apparatus time management unit 500, and an input/output interface 600. In this embodiment, the respective configurations described above are installed as hardware.

A number given to each packet reception unit 200 is an identification number for each packet reception unit 200, and a number given to each packet transmission unit 250 is an identification number for each packet transmission unit 250. A packet reception unit 200 and A packet transmission unit 250 may be one device (packet transmission/reception unit).

The packet reception unit 200 receives a packet from an external device such as the terminal 101 and another relay apparatus 110, and sends the packet to the packet transfer unit 300. At this time, the packet reception unit 200 adds control information to the received packet. Examples of the control information include the identification number of the packet reception unit 200 and the identification number of VLAN (virtual LAN). The packet reception unit 200 may have wired connection or wireless connection with the external device. In case of the wired connection, the packet reception unit 200 is coupled to the external device via a cable such as a metal cable or an optical cable.

The packet transmission unit 250 receives the packet from the packet transfer unit 300, and transmits the packet to the external device. The packet transmission unit 250 may have wired connection or wireless connection with the external device. In case of the wired connection, the packet transmission unit 250 is coupled to the external device via a cable such as the metal cable or the optical cable.

The packet transfer unit 300 performs a transfer control process such as transferring or discarding the received packet, based on the whitelist 800. The packet transfer unit 300 is constituted of hardware such as FPGA (field programmable gate array) to perform simple commands at high speed such as high-speed search for information registered in the whitelist 800 and wire-rate communication of the packet. The detailed configuration of the packet transfer unit 300 will be explained below.

The software control unit 400 performs processes such as generating a whitelist 800, and generating and transmitting an alert. The detailed configuration of the software control unit 400 will be explained below.

The apparatus time management unit 500 manages the time of the relay apparatus 100. The time of the relay apparatus 100 may be obtained through synchronization with a time server using the NTP (network time protocol) or the like, or may be obtained based on an input through an input/output device 700. In this case, the relay apparatus 100 does not need to include the apparatus time management unit 500.

The input/output interface 600 is an interface to connect the input/output device 700. The input/output device 700 includes an input device such as a keyboard, mouse, and a touch panel, and an output device such as a display and printer. An administrator or the like inputs information into the relay apparatus 100 and retrieves information from the relay apparatus 100 through the input/output device 700. The input/output device 700 may be included in the relay apparatus 100.

Next, the detailed configurations of the packet transfer unit 300 and the software control unit 400 will be explained.

First, the configuration of the packet transfer unit 300 will be explained. The packet transfer unit 300 includes a destination determining unit 310, a time determining unit 320, a transfer table memory 330, a whitelist storage memory 340, a transfer setting memory 350, and a timer storage memory 360.

The transfer table memory 330 is a storage device to store a transfer table (not shown in the figure) that is used to transfer packets. Examples of the transfer table memory 330 include a CAM (content addressable memory) and a DRAM (dynamic random-access memory).

The transfer table has a known configuration and thus a detailed description thereof is omitted here. The transfer table has entries that store the correspondence relationship between the header information of a packet and the identification information of the packet transmission unit 250, which is the destination of the packet. The transfer table is configured by an administrator or the like. Examples of the transfer table include Mac Address Table used for the layer 2 communication of the OSI (Open System Interconnection) reference model and Routing Table used for the layer 3 communication of the OSI reference model.

The whitelist storage memory 340 is a storage device to store the whitelist 800 (see FIG. 3A). The whitelist storage memory 340 is a CAM or a DRAM, for example. As described below, the whitelist 800 is generated by the software control unit 400.

The transfer setting memory 350 is a storage device to store information specifying the state of the relay apparatus 100, setting information for the transfer control, and the like. The transfer setting memory 350 is a DRAM, for example. The information stored in the transfer setting memory 350 is configured by an administrator or the like.

The states of the relay apparatus 100 of this embodiment include a learning state and an operating state. The learning state is a state for generating the whitelist 800, and the operating state is a state for performing the transfer control on packets based on the whitelist 800. The learning state takes place during a period in which the communication system is not actually operating such as a network configuration period.

The state of the relay apparatus 100 is changed based on an instruction (a command) input from the administrator or the like. In order to change the state of the relay apparatus 100, the administrator or the like inputs the instruction through the input/output device 700.

The timer storage memory 360 is a storage device to store a parameter (timer value) for monitoring behavior related to the communications performed by the allowed object. The timer storage memory 360 is a RAM (random access memory), for example.

The destination determining unit 310 refers to the transfer table stored in the transfer table memory 330 using the header information of the received packet as a key, and determines the destination of the packet. The destination determining unit 310 also controls the state of the relay apparatus 100 based on the information stored in the transfer setting memory 350.

In the learning state, in a case of receiving a packet, the destination determining unit 310 obtains header information and control information from the received packet, and sends the obtained information to the software control unit 400. The destination determining unit 310 executes the transfer control process on the packet based on the information stored in the transfer setting memory 350.

In the operating state, in a case of receiving a packet, the destination determining unit 310 performs the transfer process using the whitelist 800 and the transfer table. Specifically, the destination determining unit 310 refers to the whitelist 800, and determines whether the object for which the packet is transmitted or received is the allowed object or not. If the object for which the packet is transmitted or received is not the allowed object, the destination determining unit 310 executes the transfer control process on the packet based on the information set in the transfer setting memory 350.

The time determining unit 320 obtains the current time from the apparatus time management unit 500, and determines a reception time of the packet and the like. The time determining unit 320 also sends out the determined time to a CPU 410 of the software control unit 400 that executes a monitoring program 423, which will be described later.

Next, the configuration of the software control unit 400 will be explained below. The software control unit 400 has a CPU (control processing unit) 410 and a software memory 420.

The CPU 410 executes programs stored in the software memory 420. The CPU 410 operates as function units that realize specific functions, respectively, by executing processes in accordance with the programs. In the descriptions below, when the process is described as being performed by the program for realizing a specific function, that means that the CPU 410 is executing the program.

The software memory 420 is constituted of a ROM (read-only memory) that is a non-volatile storage element and a RAM that is a volatile storage element. The ROM stores therein programs such as BIOS (basic input/output system). The RAM stores therein the programs to be executed by the CPU 410, and includes a work area that the programs temporarily uses.

The software memory 420 of this embodiment stores therein a whitelist generating program 421, a transfer setting program 422, and a monitoring program 423.

The whitelist generating program 421 generates the whitelist 800 by analyzing the received packet, and stores the whitelist 800 in the whitelist storage memory 340.

The transfer setting program 422 stores, in the transfer table memory 330 and the transfer setting memory 350, the setting information input through the input/output device 700.

The monitoring program 423 sets monitoring parameters for detecting an abnormality of the allowed object in the learning state. Also, the monitoring program 423 detects an abnormality of the allowed object based on the monitoring parameters in the operating state.

The packet transfer unit 300 and the software control unit 400 are realized as different pieces of hardware, but they may alternatively be realized as one piece of hardware.

Figures 3B, 4:
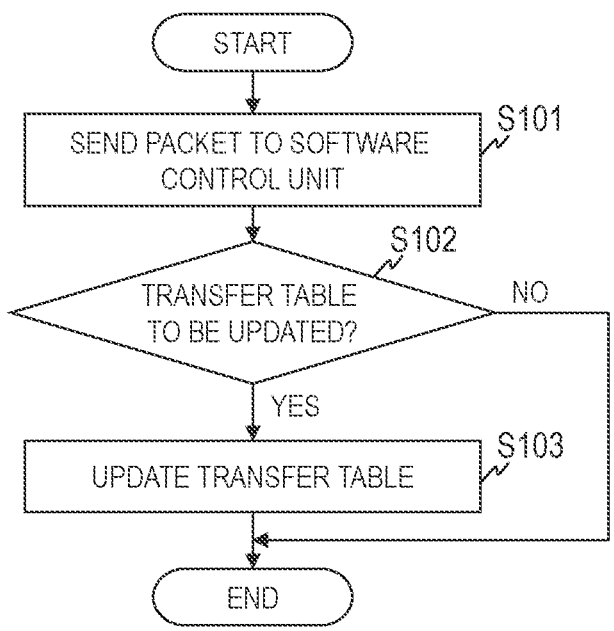

FIG. 3A and FIG. 3B are diagrams showing an example of the data structure of the whitelist 800 stored in the whitelist storage memory 340 of Embodiment 1. For ease of explanation, the whitelist 800 is divided into two parts, but the actual whitelist is managed as one table.

The whitelist 800 includes at least one entry constituted of a plurality of fields. One entry corresponds to one allowed object. The whitelist 800 shown in FIG. 3A includes n-number of entries. Each field constituting an entry is set a value obtained from the control information and the header information, and is set a value for monitoring the behavior related to the communications performed by the allowed object.

Each entry included in the whitelist 800 is constituted of an ID 801, a packet_reception_unit_number 802, a VLAN_number 803, a Source_Mac_Address 804, a Destination_Mac_Address 805, a Protocol 806, Source_IP_Address 807, a Destination_IP_Address 808, a Source_Port_number 809, a Destination_Port_number 810, a minimum communication interval 811, a maximum communication interval 812, a last communication time 813, and a timer 814.

The ID 801 is a field to store identification information for uniquely identifying an entry included in the whitelist 800.

The packet_reception_unit_number 802 is a field to store identification information for uniquely identifying the packet reception unit 200. The VLAN_number 803 is a field to store identification information of VLAN to which the packet reception unit 200 belongs. Values included in the control information are set in the packet_reception_unit_number 802 and the VLAN_number 803.

The Source_Mac_Address 804 is a field to store the Mac address of the source of a packet. The Destination_Mac_Address 805 is a field to store the Mac address of the destination of a packet. The Protocol 806 is a field to store a value indicating the type of the protocol. The Source_IP_Address 807 is a field to store the IP address of the source of a packet. The Destination_IP_Address 808 is a field to store the IP address of the destination of a packet. The Source_Port_number 809 is a field to store the port number of the source of a packet. The Destination_Port_number 810 is a field to store the port number of the destination of a packet.

Values included in the header information are set in the Source_Mac_Address 804, the Destination_Mac_Address 805, the Protocol 806, the Source_IP_Address 807, the Destination_IP_Address 808, the Source_Port_number 809, and the Destination_Port_number 810.

The minimum communication interval 811 is a field to store a minimum value of the communication interval. The maximum communication interval 812 is a field to store a maximum value of the communication interval. The last communication time 813 is a field to store the time at which a communication of the allowed object corresponding to the entry is performed. The last communication time 813 stores a time at which the packet was last received, for example. The timer 814 is a field to store an elapsed time from the last communication time 813. That is, the timer 814 stores therein a value indicating the communication interval of the allowed object.

The minimum communication interval 811 and the maximum communication interval 812 are stored therein a threshold for monitoring the behavior related to the communications performed by the allowed object, and the last communication time 813 is stored therein a time at which the relay apparatus 100 last received a packet related to the allowed object. The timer 814 is set a timer value measured by the timer.

The configuration of the entry described above is one example, and the present invention is not limited to this. One entry needs to include a field that stores therein at least one value from the control information and the header information. For example, an entry may include a field to store a value included in the header information such as TOS (type of service), flag, TTL (time to live), ID, version, or a header value.

Next, the processes in the learning state and the operating state of the relay apparatus 100 will be explained in detail. First, the process of the relay apparatus 100 in the learning state will be explained.

Figure 5:
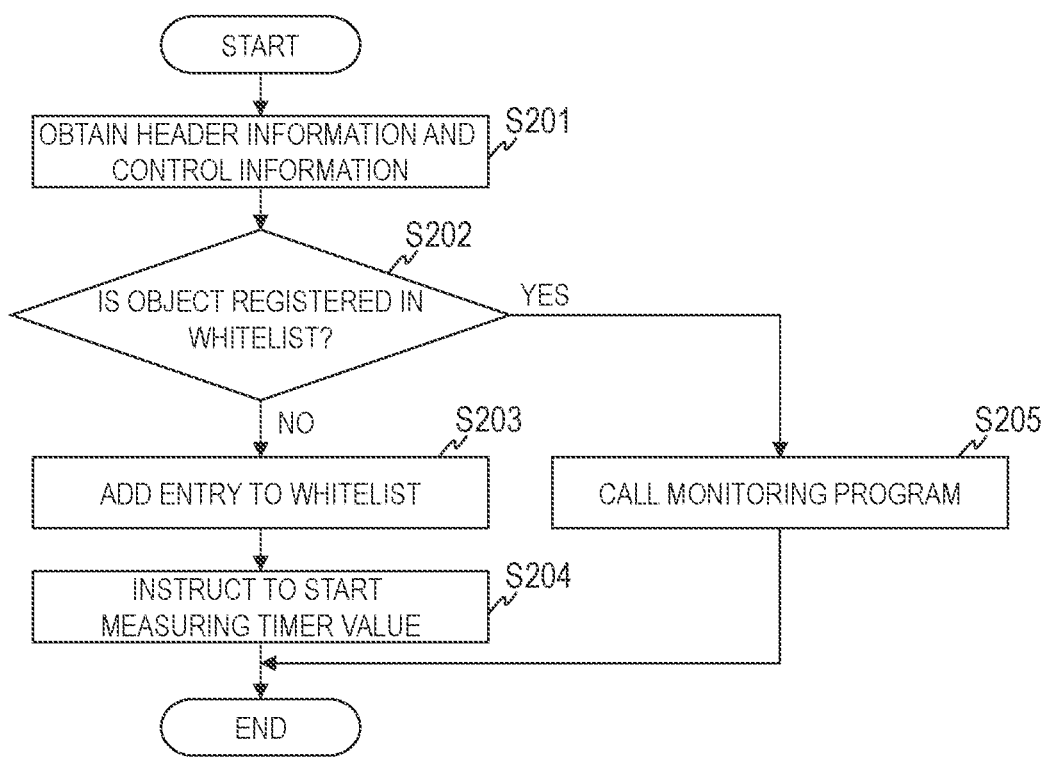
FIG. 5 is a flowchart for explaining the process executed by a whitelist generating program of Embodiment 1 in the learning state.
Figure 6:
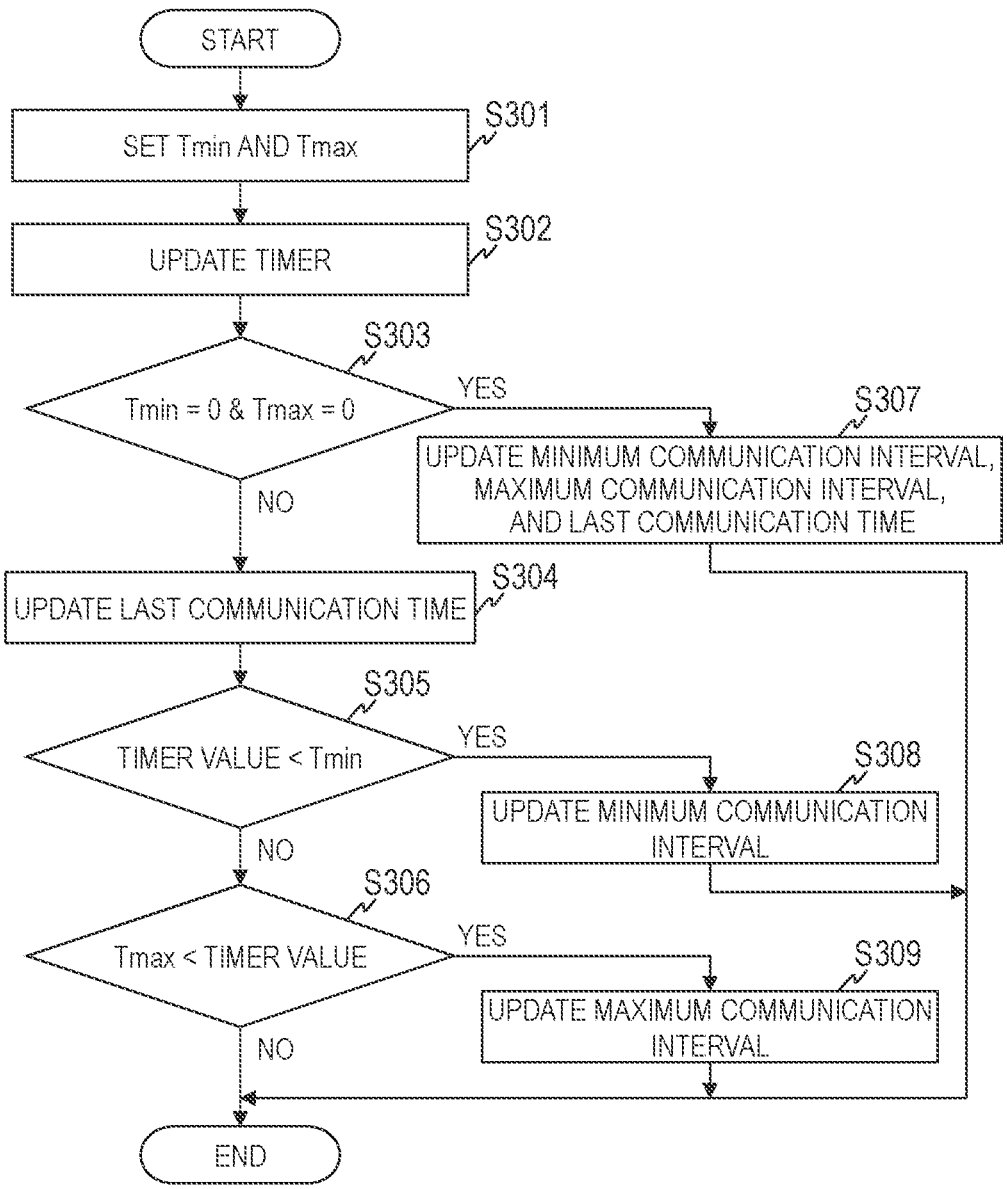
FIG. 6 is a flowchart for explaining the process executed by a monitoring program of Embodiment 1 in the learning state.

FIG. 4 is a flowchart for explaining the process executed by the packet transfer unit 300 of Embodiment 1 in the learning state. FIG. 5 is a flowchart for explaining the process executed by the whitelist generating program 421 of Embodiment 1 in the learning state. FIG. 6 is a flowchart for explaining the process executed by the monitoring program 423 of Embodiment 1 in the learning state.

In the learning state, the relay apparatus 100 analyzes received packets, and generates and updates the whitelist 800 based on the analysis result. The transfer table is also updated as needed.

First, with reference to FIG. 4, the process executed by the packet transfer unit 300 will be explained.

In a case of receiving a packet from the packet reception unit 200, the packet transfer unit 300 obtains the header information and the control information of the packet, and sends the obtained header information and the obtained control information to the software control unit 400 (Step S101). At this time, the time determining unit 320 of the packet transfer unit 300 obtains the current time from the apparatus time management unit 500, and determines the reception time of the packet. The packet transfer unit 300 sends the header information, the control information, and the reception time of the packet to the software control unit 400.

Next, the packet transfer unit 300 determines whether the transfer table needs to be updated or not (Step S102).

For example, in a case where the packet transfer unit 300 receives a notification of an address to be registered from the software control unit 400, the packet transfer unit 300 determines that the transfer table needs to be updated.

In a case where it is determined that the transfer table does not need to be updated, the packet transfer unit 300 ends the process.

In a case where it is determined that the transfer table needs to be updated, the packet transfer unit 300 updates the transfer table (Step S103). The method to update the transfer table is a known technology and therefore, the detailed description thereof is omitted.

In a case of receiving the header information and the like from the packet transfer unit 300, the software control unit 400 stores the received header information and the like in the software memory 420 temporarily, and calls the whitelist generating program 421.

With reference to FIG. 5, the process executed by the whitelist generating program 421 will be explained.

The whitelist generating program 421 obtains the header information and the control information of the packet from the software memory 420 (Step S201).

Next, the whitelist generating program 421 refers to the whitelist 800 based on the header information and the control information, and determines whether the object related to the packet is registered in the whitelist 800 or not (Step S202).

Specifically, the whitelist generating program 421 compares the values included in the header information and the control information with the values of the respective fields in the entries of the whitelist 800. The whitelist generating program 421 determines whether an entry corresponding to the packet exists or not, based on the comparison result. If there is an entry corresponding to the packet, the whitelist generating program 421 determines that the object related to the packet is registered in the whitelist 800.

In a case where it is determined that the object related to the packet is not registered in the whitelist 800, the whitelist generating program 421 registers the object in the whitelist 800 (Step S203). Specifically, the process described below is performed.

The whitelist generating program 421 generates, in the software memory 420, a temporary entry having the same data structure as each entry of the whitelist 800.

Then the whitelist generating program 421 sets a unique identification number in the ID 801 of the temporary entry, and sets the minimum communication interval 811, the maximum communication interval 812, and the timer 814 to zero. The whitelist generating program 421 also sets the reception time of the packet in the last communication time 813 of the temporary entry. Furthermore, the whitelist generating program 421 sets respective values included in the header information and like in the remaining fields of the temporary entry.

The whitelist generating program 421 adds the temporary entry to the whitelist 800 stored in the whitelist storage memory 340 via the packet transfer unit 300. The description above is for Step S203.

Next, the whitelist generating program 421 instructs the monitoring program 423 to start measuring the timer value (Step S204). This instruction includes the identification number set in the ID 801.

In a case of receiving the instruction, the monitoring program 423 activates the timer corresponding to the identification number included in the instruction, and starts measuring the timer value. Specifically, the monitoring program 423 stores a timer corresponding to the ID 801 in the timer storage memory 360, and starts measuring the timer value.

In Step S202, in a case where it is determined that the object related to the packet is registered in the whitelist 800, the whitelist generating program 421 calls the monitoring program 423 (Step S205), and ends the process. At this time, the whitelist generating program 421 inputs the identification number set in the ID 801 of the searched entry into the monitoring program 423.

With reference to FIG. 6, the process executed by the monitoring program 423 will be explained.

The monitoring program 423 sets a variable Tmin and a variable Tmax (Step S301).

Specifically, the monitoring program 423 refers to the whitelist 800 to search an entry in which the ID 801 matches the input identification information. The monitoring program 423 sets a value, which is stored in the minimum communication interval 811 of the searched entry, to the variable Tmin, and sets a value, which is stored in the maximum communication interval 812 of the searched entry, to the variable Tmax.

Next, the monitoring program 423 updates the timer 814 of the searched entry (Step S302).

Specifically, the monitoring program 423 refers to the timer storage memory 360 to obtain the timer value from the timer corresponding to the searched entry, and stores the obtained timer value in the timer 814 of the searched entry. The monitoring program 423 initializes the timer, and restarts the measurement.

Next, the monitoring program 423 determines whether the variable Tmin and the variable Tmax are zero or not (Step S303).

In a case where it is determined that the variable Tmin and the variable Tmax are zero, the monitoring program 423 updates the minimum communication interval 811, the maximum communication interval 812, and the last communication time 813 of the searched entry (Step S307). Then the monitoring program 423 ends the process.

Specifically, the monitoring program 423 sets the current time in the last communication time 813 of the searched entry. The current time is a time determined by the time determining unit 320. The monitoring program 423 also sets the timer value stored in the timer 814 into the minimum communication interval 811 and the maximum communication interval 812 of the searched entry.

In a case where it is determined that one of the variable Tmin and the variable Tmax is not zero, the monitoring program 423 updates the last communication time 813 of the searched entry (Step S304).

Specifically, the monitoring program 423 sets the current time in the last communication time 813 of the searched entry.

Next, the monitoring program 423 determines whether the timer value stored in the timer 814 of the searched entry is smaller than the variable Tmin or not (Step S305).

In a case where it is determined that the timer value stored in the timer 814 of the searched entry is smaller than the variable Tmin, the monitoring program 423 updates the minimum communication interval 811 of the searched entry (Step S308). Then the monitoring program 423 ends the process.

Specifically, the monitoring program 423 sets the timer value stored in the timer 814 into the minimum communication interval 811 of the searched entry.

In a case where it is determined that the timer value stored in the timer 814 of the searched entry is equal to or greater than the variable Tmin, the monitoring program 423 determines whether the timer value stored in the timer 814 of the searched entry is greater than the variable Tmax or not (Step S306).

In a case where it is determined that the timer value stored in the timer 814 of the searched entry is greater than the variable Tmax, the monitoring program 423 updates the maximum communication interval 812 of the searched entry (Step S309). Then the monitoring program 423 ends the process.

Specifically, the monitoring program 423 sets the timer value stored in the timer 814 in the maximum communication interval 812 of the searched entry.

In a case where it is determined that the timer value stored in the timer 814 of the searched entry is equal to or smaller than the variable Tmax, the monitoring program 423 ends the process.

As described above, in the learning state, the relay apparatus 100 of this embodiment generates the whitelist 800 and learns threshold values (minimum communication interval and maximum communication interval) used for detecting an abnormality of the allowed objects.

In a case of transitioning to the operating state from the learning state, the relay apparatus 100 ends the measurement of the timer values of all allowed objects.

Next, the process of the relay apparatus 100 in the operating state will be explained.

Figure 7:
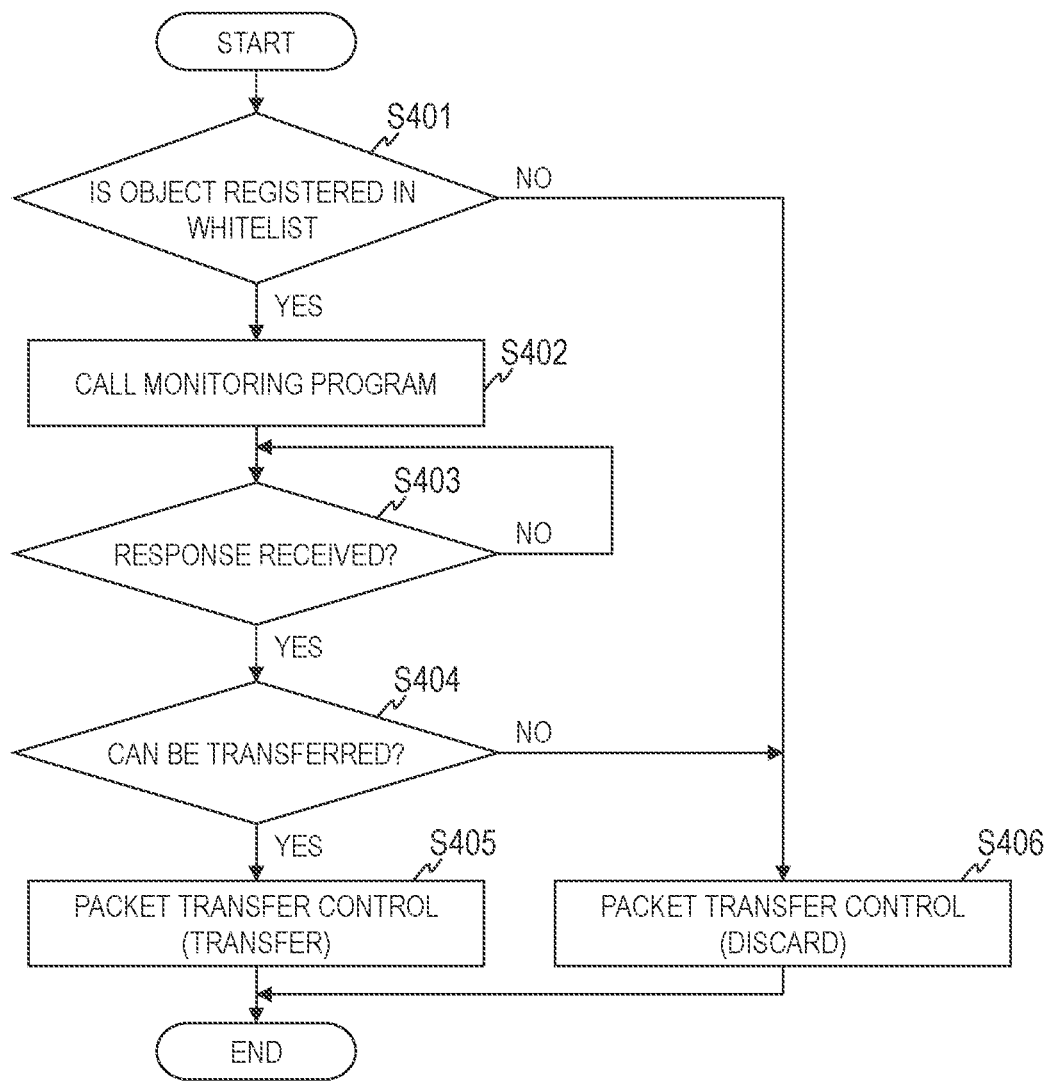
FIG. 7 is a flowchart for explaining the process executed by the packet transfer unit of Embodiment 1 in an operating state.
Figure 8:
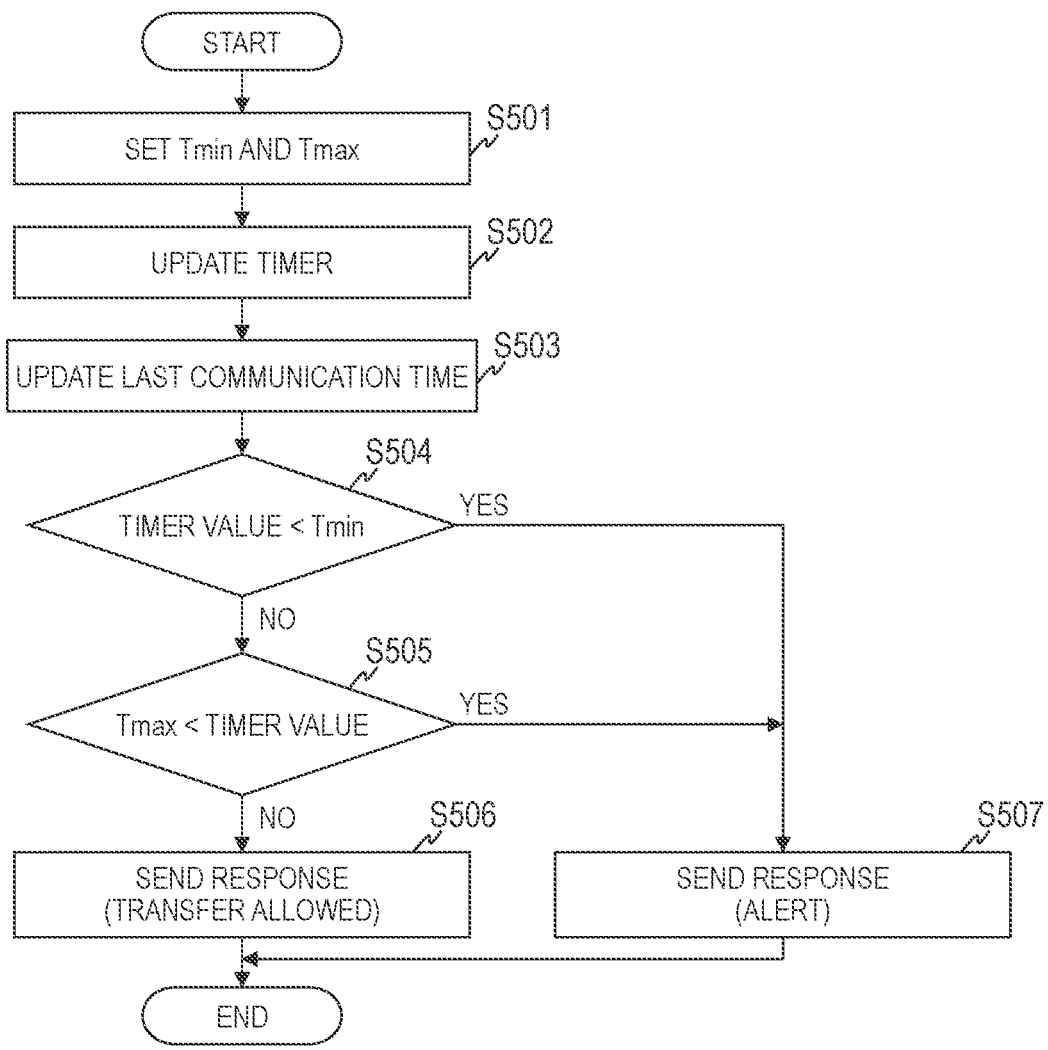
FIG. 8 is a flowchart for explaining the process executed by the monitoring program of Embodiment 1 in the operating state.
Figure 9:
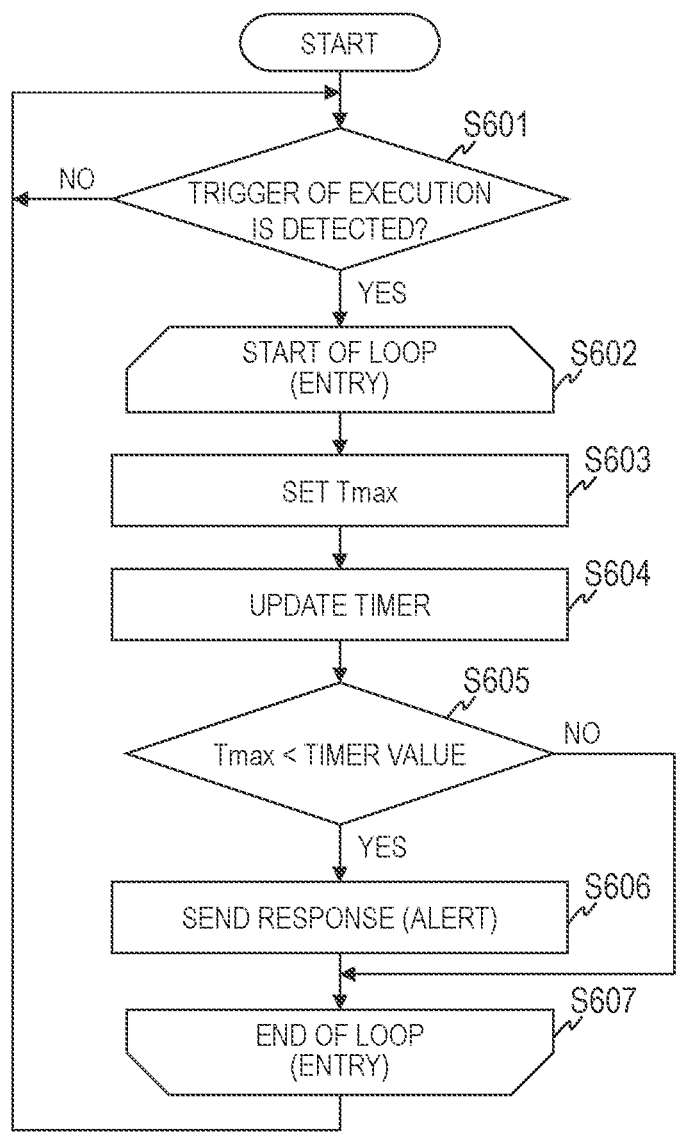
FIG. 9 is a flowchart for explaining the process executed periodically by the monitoring program of Embodiment 1 in the operating state.

FIG. 7 is a flowchart for explaining the process executed by the packet transfer unit 300 of Embodiment 1 in the operating state. FIG. 8 is a flowchart for explaining the process executed by the monitoring program 423 of Embodiment 1 in the operating state. FIG. 9 is a flowchart for explaining the process executed periodically by the monitoring program 423 of Embodiment 1 in the operating state.

FIG. 7 and FIG. 8 are the flowcharts explaining the processes executed in a case where the relay apparatus 100 receives a packet, and FIG. 9 is a flowchart explaining the process executed periodically.

In the operating state, the relay apparatus 100 analyzes the received packet, and performs transfer control on the packet based on the analysis result and the whitelist 800. The relay apparatus 100 also monitors the communication interval of each of the allowed object periodically.

With reference to FIG. 7, the process executed by the packet transfer unit 300 will be explained.

In a case of receiving a packet from the packet reception unit 200, the packet transfer unit 300 refers to the whitelist 800 stored in the whitelist storage memory 340, and determines whether an object related to the packet is registered in the whitelist 800 or not (Step S401).

Specifically, the packet transfer unit 300 refers to the whitelist 800 based on the header information and the control information obtained from the packet, and searches for an entry that matches with the header information and the control information. If there is an entry matching the header information and the control information, the packet transfer unit 300 determines that the object related to the packet is registered in the whitelist 800.

In a case where it is determined that the object related to the packet is not registered in the whitelist 800, the packet transfer unit 300 performs the packet transfer control (Step S406). Thereafter, the packet transfer unit 300 ends the process.

In the packet transfer control of Step S406, the packet transfer unit 300 discards the received packet, issues a notification indicating that a packet of an object not registered in the whitelist 800 has been received, and the like. The process to be executed when a packet of an object not registered in the whitelist 800 is received is not limited to that of this embodiment.

In a case where it is determined that the object related to the packet is registered in the whitelist 800, the packet transfer unit 300 calls the monitoring program 423 (Step S402). Thereafter, the packet transfer unit 300 makes the shift to a waiting state.

At this time, the packet transfer unit 300 inputs the reception time of the packet determined by the time determining unit 320 and the identification number set in the ID 801 of the searched entry.

The packet transfer unit 300 determines whether a response has been received from the monitoring program 423 or not (Step S403).

In a case where the response has not been received from the monitoring program 423, the packet transfer unit 300 returns to Step S403 after a prescribed period of time has elapsed.

In a case where the response has been received from the monitoring program 423, the packet transfer unit 300 determines whether it is possible to transfer the received packet or not based on the response (Step S404).

Specifically, the packet transfer unit 300 determines whether the type of the response is "transfer allowed" or "alert." If the type of the response is "transfer allowed," the packet transfer unit 300 determines that it is possible to transfer the received packet. On the other hand, if the type of the response is "alert," the packet transfer unit 300 determines that it is not possible to transfer the received packet.

In a case where it is not possible to transfer the received packet, the packet transfer unit 300 performs packet transfer control (Step S406). Thereafter, the packet transfer unit 300 ends the process.

In a case where it is possible to transfer the received packet, the packet transfer unit 300 performs packet transfer control (Step S405). Thereafter, the packet transfer unit 300 ends the process.

In the packet transfer control of Step S405, the packet transfer unit 300 transfers the packet to a destination apparatus based on the destination information and the like included in the header information of the packet.

With reference to FIG. 8, the process to be executed by the monitoring program 423, which is called by the packet transfer unit 300, will be explained.

The monitoring program 423 sets a variable Tmin and a variable Tmax (Step S501).

Specifically, the monitoring program 423 refers to the whitelist 800 to search an entry in which the ID 801 matches the input identification information. The monitoring program 423 sets a value, which is stored in the minimum communication interval 811 of the searched entry, to the variable Tmin, and sets a value, which is stored in the maximum communication interval 812 of the searched entry, to the variable Tmax.

The monitoring program 423 updates the timer 814 of the searched entry (Step S502).

Specifically, the monitoring program 423 refers to the timer storage memory 360 to obtain the timer value from the timer corresponding to the searched entry, and stores the obtained timer value in the timer 814 of the searched entry. The monitoring program 423 initializes the timer, and restarts the measurement.

Next, the monitoring program 423 updates the last communication time 813 of the searched entry (Step S503).

Specifically, the monitoring program 423 sets the reception time of the input packet in the last communication time 813 of the searched entry.

Next, the monitoring program 423 determines whether the timer value stored in the timer 814 of the searched entry is smaller than the variable Tmin or not (Step S504).

In a case where it is determined that the timer value stored in the timer 814 of the searched entry is smaller than the variable Tmin, the monitoring program 423 sends a response whose type is "alert" to the packet transfer unit 300 (Step S507). Then the monitoring program 423 ends the process. The monitoring program 423 may also send an alert to the input/output device 700 to notify the administrator and the like of the abnormality of the allowed object.

The generated alert may include information indicating that the communication interval of the allowed object is too short.

In a case where it is determined that the timer value stored in the timer 814 of the searched entry is equal to or greater than the variable Tmin, the monitoring program 423 determines whether the timer value stored in the timer 814 of the searched entry is greater than the variable Tmax or not (Step S505).

In a case where it is determined that the timer value stored in the timer 814 of the searched entry is greater than the variable Tmax, the monitoring program 423 sends a response whose type is "alert" to the packet transfer unit 300 (Step S507). Then the monitoring program 423 ends the process.

The generated alert may include information indicating that the communication interval of the allowed object is too long.

In a case where it is determined that the timer value stored in the timer 814 of the searched entry is equal to or smaller than the variable Tmax, the monitoring program 423 sends a response whose type is "transfer allowed" to the packet transfer unit 300 (Step S506).

As described above, in a case where the communication interval is smaller than the minimum communication interval 811 or greater than the maximum communication interval 812, the relay apparatus 100 of Embodiment 1 can cut off the communications performed by an object even if such an object is the allowed object registered in the whitelist 800, and can notify that an abnormality has detected.

Whether the response whose type is "alert" is generated or not may depend on how many times the determination process has taken place in Step S504 and Step S505. A threshold of the number of times of the determination process can be set and updated by the administrator at a desired timing.

Next, with reference to FIG. 9, the process executed by the monitoring program 423 periodically will be explained.

The monitoring program 423 determines whether a trigger of execution is detected or not (Step S601).

In this embodiment, the monitoring program 423 determines whether the execution period has elapsed or not. In a case where it is determined that the execution period has elapsed, the monitoring program 423 determines that a trigger of execution is detected. The monitoring program 423 may also determine a trigger of execution is detected in a case of receiving an execution instruction from the administrator or the like.

In a case where it is determined that a trigger of execution is not detected, the monitoring program 423 returns to Step S601 after a prescribed period of time has elapsed.

In a case where it is determined that a trigger of execution is detected, the monitoring program 423 starts a loop process of the entries included in the whitelist 800 (Step S602).

Specifically, the monitoring program 423 selects one target entry from the whitelist 800. The monitoring program 423 also obtains the current time from the time determining unit 320. There is no specific limitation on the method to select the target entry in this embodiment.

The monitoring program 423 sets a variable Tmax (Step S603).

Specifically, the monitoring program 423 sets a value stored in the maximum communication interval 812 of the target entry to the variable Tmax.

Next, the monitoring program 423 updates the timer 814 of the target entry (Step S604).

Specifically, the monitoring program 423 refers to the timer storage memory 360 to obtain the timer value from the timer corresponding to the target entry, and stores the obtained timer value in the timer 814 of the target entry. In Step S604, the timer is not initialized.

Next, the monitoring program 423 determines whether the timer value stored in the timer 814 of the target entry is greater than the variable Tmax or not (Step S605).

In a case where it is determined that the timer value stored in the timer 814 of the target entry is equal to or smaller than the variable Tmax, the monitoring program 423 proceeds to Step S607.

In a case where it is determined that the timer value stored in the timer 814 of the target entry is greater than the variable Tmax, the monitoring program 423 sends a response whose type is "alert" to the packet transfer unit 300 (Step S606). Thereafter, the monitoring program 423 proceeds to Step S607. The monitoring program 423 may also send the alert to the input/output device 700.

The generated alert may include information indicating that no communication is not performed for a long period of time.

In a case of receiving the response, the packet transfer unit 300 may add a flag to the target entry so that the communications from the allowed object corresponding to the target entry is cut off.

In Step S607, the monitoring program 423 determines whether the process is complete for all entries of the whitelist 800.

In a case where it is determined that the process is not complete for all entries of the whitelist 800, the monitoring program 423 returns to Step S602 to select a new target entry and executes the same process.

In a case where it is determined that the process is complete for all entries of the whitelist 800, the monitoring program 423 returns to Step S601 after a prescribed period of time has elapsed.

As described above, in a case where the communication interval is greater than the maximum communication interval 812, the relay apparatus 100 of Embodiment 1 can cut off the communications from an object even if such an object is the allowed object registered in the whitelist 800, and can notify that an abnormality has detected.

In a case where a terminal registered in the whitelist 800 is infected with virus and has become a stepping stone for the DDoS attack, the terminal sends out a number of packets in a short period of time. The prior relay apparatus would transfer all the packets sent from the terminal registered in the whitelist. Thus, it would not be possible to detect or defend against the DDoS attack. On the other hand, the relay apparatus 100 of Embodiment 1 can cut off the communication in a case of detecting the communications with short communication interval. This makes it possible to detect or defend against the DDoS attack.

In a case where a terminal registered in the whitelist or a terminal in which an application registered in the whitelist runs occurs an abnormality such as malfunction or theft, the prior relay apparatus cannot detect such the abnormality. On the other hand, the relay apparatus 100 of Embodiment 1 can detect an abnormality of an object by detecting a terminal that is registered in the whitelist and that has not been in operation for a prescribed period of time.

It is not necessary to prepare for a separate apparatus to detect an abnormality of the allowed objects, and it is not necessary to significantly change the configuration of the relay apparatus 100. Thus, the function of detecting abnormality of the allowed objects can be provided at low cost.

Following is representative aspects of the present invention other than those described in claims:

(1) A transfer control method executed by a communication apparatus that transfers received data, the communication apparatus including: an arithmetic device, a storage device coupled to the arithmetic device, and a communication interface coupled to the arithmetic device, storing a whitelist to manage an allowed object that is allowed to perform communications via the communication apparatus, the transfer control method comprises: a first step of performing, by the arithmetic device, transfer control on the received data based on the whitelist; and a second step of analyzing, by the arithmetic device, behavior related to communications performed by the allowed object, wherein the second step includes: a step of calculating, by the arithmetic device, a monitoring parameter that indicates the behavior related to the communications performed by the allowed object, and a step of detecting, by the arithmetic device, the allowed object where an abnormality occurred based on the monitoring parameter.

(2) The transfer control method according to (1), wherein the monitoring parameter is a communication interval of the communication performed by the allowed object, and wherein the second step includes a step of detecting, by the arithmetic device, the allowed object where an abnormality occurred based on comparison results of the communication interval and a threshold value.

(3) The transfer control method according to (2), wherein the communication apparatus manages a maximum communication interval as the threshold value, and wherein the second step includes a step of determining, by the arithmetic device, a first allowed object occurring an abnormality in a case where the communication interval of the first allowed object is greater than the maximum communication interval.

(4) The transfer control method according to (2), wherein the communication apparatus manages a minimum communication interval as the threshold value, and wherein the second step includes a step of determining, by the arithmetic device, a first allowed object occurring an abnormality in a case where the communication interval of the first allowed object is smaller than the minimum communication interval.

(5) The transfer control method according to (2) further including: a step of generating, by the arithmetic device, an alert for notifying that the allowed object occurring an abnormality is detected in a case of detecting the allowed object occurring an abnormality; and a step of transmitting, by the arithmetic device, the alert.

(6) The transfer control method according to (2) further including a step of cutting off, by the arithmetic device, the communication of the allowed object occurring an abnormality in a case of detecting the allowed object occurring an abnormality.

(7) The transfer control method according to (2) further including: a step of analyzing, by the arithmetic device, communications performed by a plurality of the allowed objects via the communication apparatus; a step of calculating, by the arithmetic device, the communication interval of each of the plurality of the allowed objects based on analysis results of the communication of the plurality of the allowed objects; and a step of storing, by the arithmetic device, the communication interval of the each of the plurality of the allowed objects in the storage device as the threshold value.

The present invention is not limited to the above embodiment and includes various modification examples. In addition, for example, the configurations of the above embodiment are described in detail so as to describe the present invention comprehensibly. The present invention is not necessarily limited to the embodiment that is provided with all of the configurations described. In addition, a part of each configuration of the embodiment may be removed, substituted, or added to other configurations.

A part or the entirety of each of the above configurations, functions, processing units, processing means, and the like may be realized by hardware, such as by designing integrated circuits therefor. In addition, the present invention can be realized by program codes of software that realizes the functions of the embodiment. In this case, a storage medium on which the program codes are recorded is provided to a computer, and a CPU that the computer is provided with reads the program codes stored on the storage medium. In this case, the program codes read from the storage medium realize the functions of the above embodiment, and the program codes and the storage medium storing the program codes constitute the present invention.

Examples of such a storage medium used for supplying program codes include a flexible disk, a CD-ROM, a DVD-ROM, a hard disk, a solid state drive (SSD), an optical disc, a magneto-optical disc, a CD-R, a magnetic tape, a non-volatile memory card, and a ROM.

The program codes that realize the functions written in the present embodiment can be implemented by a wide range of programming and scripting languages such as assembler, C/C++, Perl, shell scripts, PHP, and Java (registered trademark).

It may also be possible that the program codes of the software that realizes the functions of the embodiment are stored on storing means such as a hard disk or a memory of the computer or on a storage medium such as a CD-RW or a CD-R by distributing the program codes through a network and that the CPU that the computer is provided with reads and executes the program codes stored on the storing means or on the storage medium.

In the above embodiment, only control lines and information lines that are considered as necessary for description are illustrated, and all the control lines and information lines of a product are not necessarily illustrated. All of the configurations of the embodiment may be connected to each other.

What is claimed is:

1. A communication apparatus that transfers received data, comprising:
   an arithmetic device;
   a storage device coupled to the arithmetic device; and
   a communication interface coupled to the arithmetic device,
   the storage device storing a whitelist to manage an allowed object that is allowed to perform communications via the communication apparatus,
   comprising:
   the arithmetic device being coupled to a memory storing instructions that when executed by the arithmetic device configure the arithmetic device to:
   perform transfer control on the received data based on the whitelist;
   analyze behavior related to communications performed by the allowed object, and
   calculate a monitoring parameter that indicates the behavior related to the communications performed by the allowed object,
   detect the allowed object where an abnormality occurred based on the monitoring parameter,
   wherein the monitoring parameter is a communication interval of the communications performed by the allowed object, and
   wherein the arithmetic device is further configured to:
   detect the allowed object where an abnormality occurred based on comparison results of the communication interval and a threshold value,
   analyze communications performed by a plurality of allowed objects via the communication apparatus;
   calculate the communication interval of each of the plurality of the allowed objects based on analysis results of the communications performed by the plurality of the allowed objects; and
   store the communication interval of the each of the plurality of the allowed objects in the storage device as the threshold value.

2. The communication apparatus according to claim 1, wherein the arithmetic device is further configured to:
   manage a maximum communication interval as the threshold value; and determine that a first allowed object occurring an abnormality in a case where the communication interval of the first allowed object is greater than the maximum communication interval.

3. The communication apparatus according to claim 1, wherein the arithmetic device is further configured to:
manage a minimum communication interval as the threshold value; and
determine that a first allowed object occurring an abnormality in a case where the communication interval of the first allowed object is smaller than the minimum communication interval.

4. The communication apparatus according to claim 1, wherein the arithmetic device is further configured to:
generate an alert for notifying that the allowed object occurring an abnormality is detected in a case of detecting the allowed object occurring an abnormality; and
transmit the alert.

5. The communication apparatus according to claim 1, wherein the arithmetic device is further configured to instruct the transfer unit to cut off the communications performed by the allowed object occurring an abnormality in a case of detecting the allowed object occurring an abnormality.

6. A non-transitory computer readable storage medium having stored thereon a program which is executed by a communication apparatus that transfers received data,
the communication apparatus including an arithmetic device, a storage device coupled to the arithmetic device, and a communication interface coupled to the arithmetic device, and the storage device storing therein a whitelist to manage an allowed object that is allowed to perform communications via the communication apparatus,
the program causing the communication apparatus to execute:
a first procedure of performing transfer control on the received data based on the whitelist; and
a second procedure of analyzing behavior related to communications performed by the allowed object, and
the second procedure including:
a procedure of calculating a monitoring parameter that indicates the behavior related to the communications performed by the allowed object; and
a procedure of detecting the allowed object where an abnormality occurred based on the monitoring parameter
wherein the monitoring parameter is a communication interval of the communications performed by the allowed object,
wherein the second procedure includes detecting the allowed object where an abnormality occurred based on comparison results of the communication interval and a threshold value, and
wherein the program further causes the communication apparatus to execute:
a procedure of analyzing communications performed by a plurality of allowed objects via the communication apparatus;
a procedure of calculating the communication interval of each of the plurality of the allowed objects based on analysis results of the communication of the plurality of the allowed objects; and
a procedure of storing the communication interval of the each of the plurality of the allowed objects in the storage device as the threshold value.

7. The non-transitory computer readable storage medium according to claim 6,
wherein the communication apparatus manages a maximum communication interval as the threshold value, and
wherein the second procedure includes a procedure of determining that a first allowed object occurring an abnormality in a case where the communication interval of the first allowed object is greater than the maximum communication interval.

8. The non-transitory computer readable storage medium according to claim 6,
wherein the communication apparatus manages a minimum communication interval as the threshold value, and
wherein the second procedure includes a procedure of determining that a first allowed object occurring an abnormality in a case where the communication interval of the first allowed object is smaller than the minimum communication interval.

9. The non-transitory computer readable storage medium according to claim 6,
wherein the program causes the communication apparatus to execute:
a procedure of generating an alert for notifying that the allowed object occurring an abnormality is detected; and a procedure of transmitting the alert.

10. The non-transitory computer readable storage medium according to claim 6, wherein the program causes the communication apparatus to execute a procedure of cutting off the communications performed by the allowed object occurring an abnormality in a case of detecting the allowed object occurring an abnormality.

* * * * *